Aug. 28, 1956 J. KOLBE 2,760,786
BANKING VEHICLE WITH SEPARATE SUPERSTRUCTURE BANKING
MOTION CENTER AND POWER-ASSIST BANKING
Filed May 7, 1952 3 Sheets-Sheet 1

INVENTOR.
Joachim Kolbe
BY Andrus & Sceales
Attorneys

Aug. 28, 1956 J. KOLBE 2,760,786
BANKING VEHICLE WITH SEPARATE SUPERSTRUCTURE BANKING
MOTION CENTER AND POWER-ASSIST BANKING
Filed May 7, 1952 3 Sheets-Sheet 2
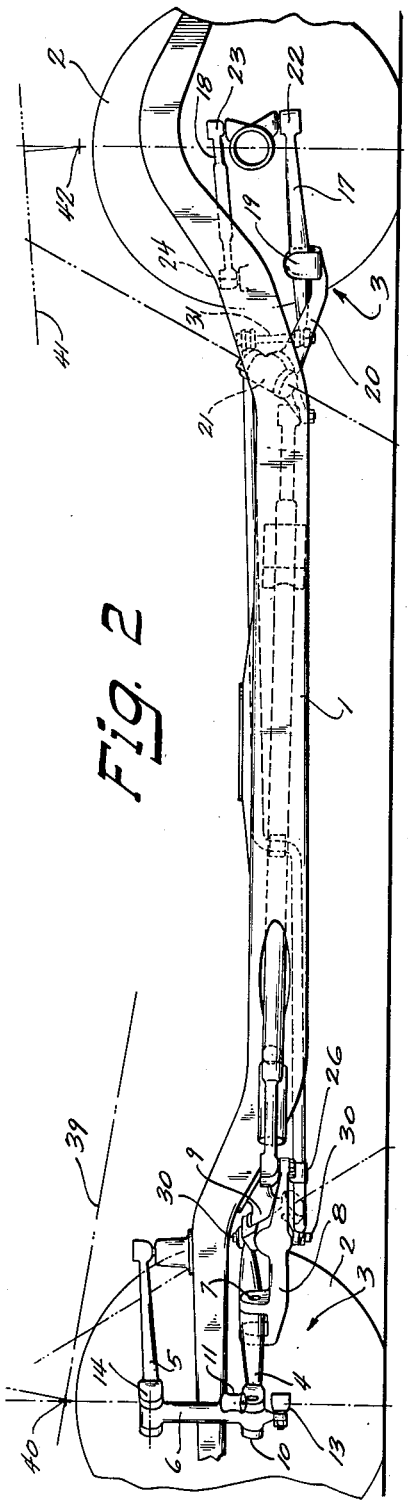
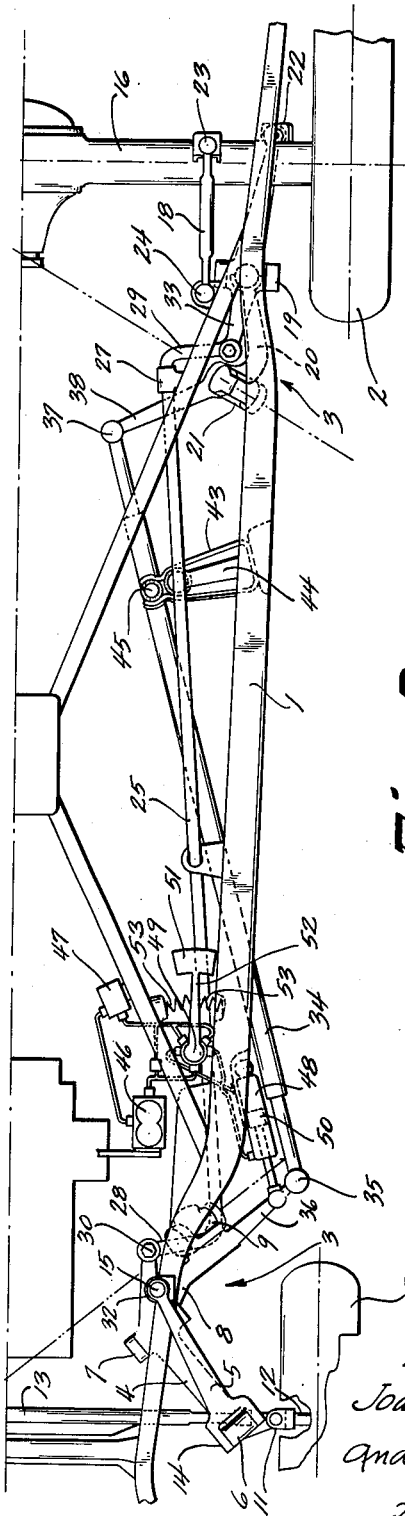
INVENTOR.
Joachim Kolbe
Andrus & Sceales
Attorneys Aug. 28, 1956 J. KOLBE 2,760,786
BANKING VEHICLE WITH SEPARATE SUPERSTRUCTURE BANKING
MOTION CENTER AND POWER-ASSIST BANKING
Filed May 7, 1952 3 Sheets-Sheet 3
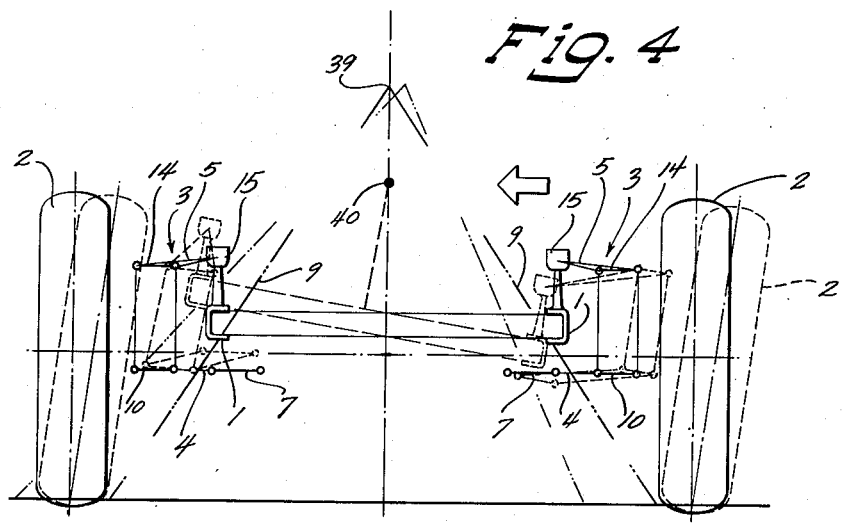
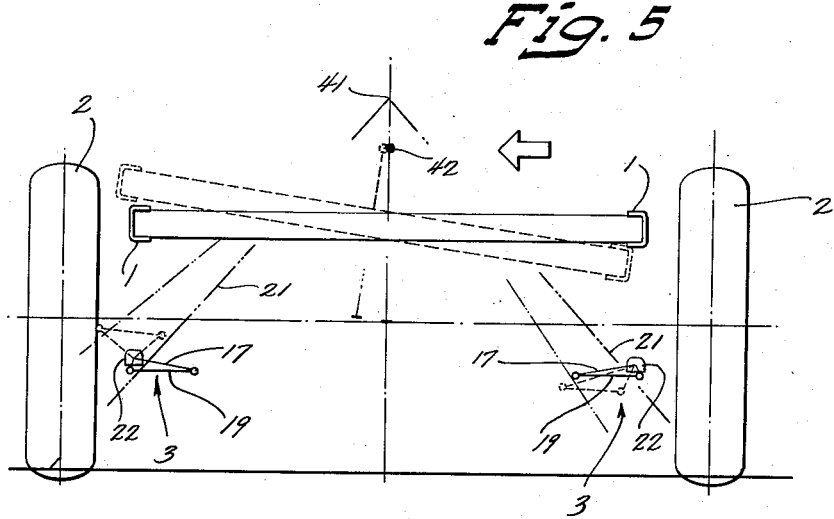
INVENTOR.
Joachim Kolbe
BY Andrus & Scealer
Attorneys

United States Patent Office 2,760,786
Patented Aug. 28, 1956

2,760,786

BANKING VEHICLE WITH SEPARATE SUPERSTRUCTURE BANKING MOTION CENTER AND POWER-ASSIST BANKING

Joachim Kolbe, Sussex, Wis.

Application May 7, 1952, Serial No. 286,514

16 Claims. (Cl. 280—112)

This invention relates to banking vehicles having a superstructure supported by two or more correlated pairs of wheels upon the road to turn during banking about both an effective longitudinally extending axis located near its center of mass and an effective longitudinally extending axis located near the road.

The invention relates more specifically to vehicles in which the superstructure is supported upon a plurality of pairs of interconnected banking arms to effect banking of the superstructure, as described in a number of patents granted to the present inventor. United States Patents No. 2,576,686 and No. 2,580,558 are referred to by way of example.

The banking arms are of the general construction referred to in the above U. S. patents, in which each banking arm extends between the superstructure and the road or its equivalent, and preferably embodies a banking connection between the arm and the superstructure permitting a turn of the entire banking arm relative to the superstructure about an effective inclined banking axis.

The present invention takes advantage of the fact that it is possible to greatly reduce or eliminate the lateral banking shifting of the mass, typical for banking arm supported vehicles and to have part or all of the force needed to operate the banking mechanism supplied directly or indirectly by the engine power of the vehicle.

A principal object of the invention is to make use of power units available in modern automobiles to secure improved ride and handling characteristics for banking vehicles.

A second principal object of the invention is to restrict coordination of the lateral shifting of the front and rear running gears relative to the superstructure to the banking motion, and to permit free oscillation of each running gear without undue effect on the other.

Another object is to provide adjustable and variable means working in cooperation to secure an inclined position of the vehicle superstructure as the vehicle travels around the curve.

Another object is to provide a banking vehicle mounting which may fit even more closely into the general outline and space requirements of present day vehicles.

Another object is to provide a given inward banking effect with substantially less sideward movement of the superstructure.

Another object is to keep the desired resistance against banking substantially independent of the necessary stabilizing forces applied to the superstructure to regulate one sided load conditions.

Another object is to provide means to stabilize the superstructure and to block vibrations which otherwise might result from the employment of an increased number of suspension parts and resilient means typical for banking mechanisms.

Another object is to apply engine supplied forces within the banking structure strong enough to overcome frictional and gravity resistance against the banking movement of the superstructure.

Another object of the invention is to reduce the lateral shifting of the drive shaft connecting the engine with the differential of the vehicle.

Another object of the invention is to increase the margin of safety against turning over of the vehicle under the influence of lateral forces.

Another object is to provide for two separate motion centers, similar to the arrangements disclosed in the patents referred to above, but with the banking motion center arranged more closely to the center of mass of the superstructure.

The structure of the vehicle to which the present invention has been applied in general combines banking geometry systems as described in U. S. application Serial No. 742,496, filed April 19, 1947, and now Patent No. 2,657,067 dated October 27, 1953, by the present inventor with systems disclosed in the U. S. patents referred to above, and relates to a more desirable positioning of the wheels as well as of the superstructure, the basic difference of the structure disclosed in this application being the lower positioning of the effective motion center line for the banking motion of the superstructure to correspond nearly to the location for the center of mass, and the use of standard power units for operation of the banking structure to effect a roll banking of the superstructure, i. e. a turning of the superstructure about its center of mass to a banked position.

The invention is illustrated in the accompanying drawings in which:

Fig. 2 is a side elevation of the vehicle mounting of Fig. 1;

Fig. 3 is a partial plan view of the vehicle mounting of Fig. 1;

Fig. 4 is a schematic front end elevation of some of the structure shown in Fig. 1, with certain parts additionally shown in dotted outline in the banked position; and Fig. 5 is a schematic rear end elevation of some of the structure shown in Fig. 1 with certain parts additionally shown in dotted outline in the banked position.

Figure 1:
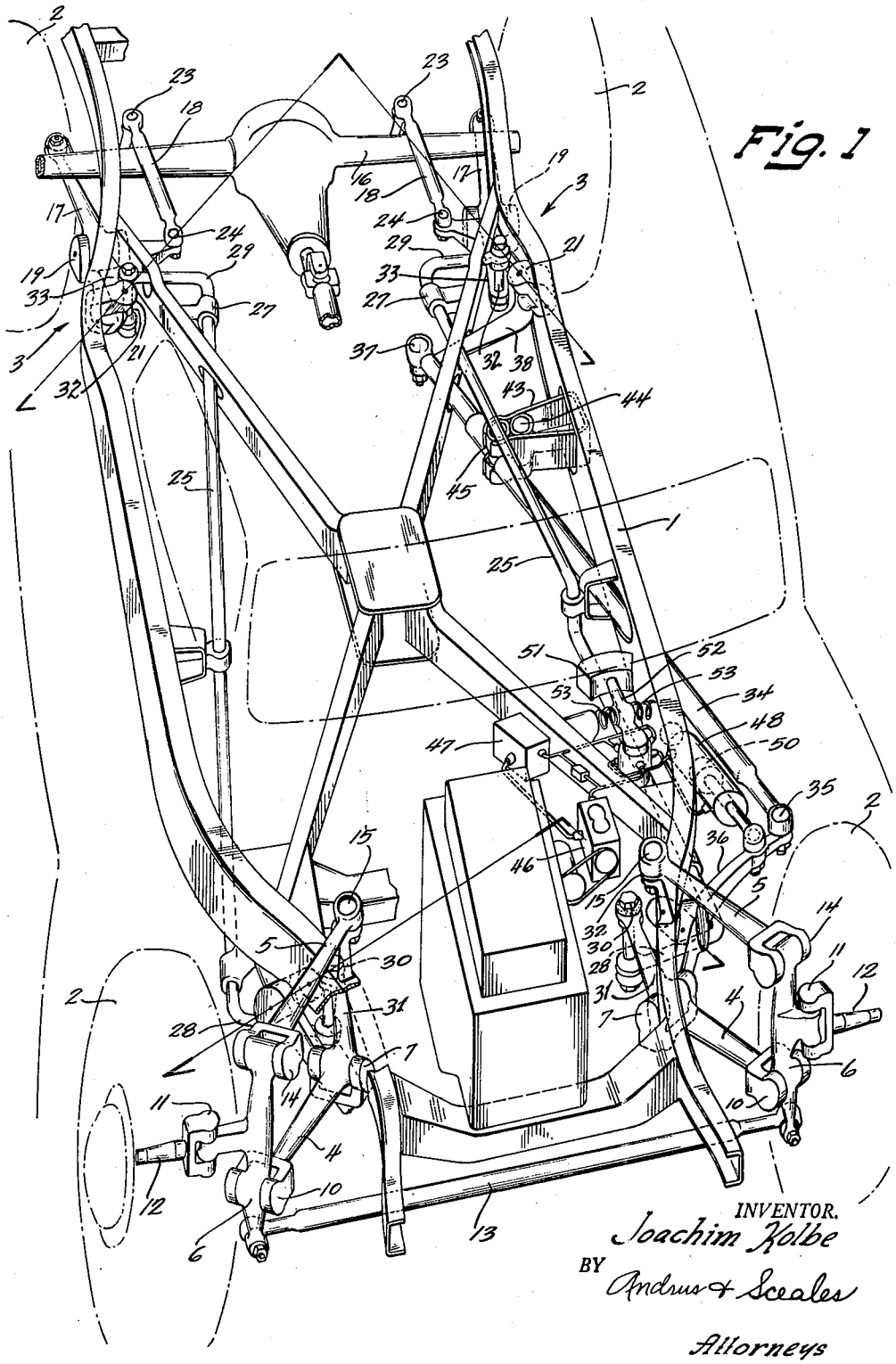
Fig. 1 is a perspective view of a vehicle mounting of the type to which the invention is particularly adapted showing the superstructure of the vehicle in an upright, unbanked position and hydraulic booster equipment to operate the mechanism.

The drawings in general illustrate a vehicle of the passenger automobile type having a superstructure or body shown in broken outline and represented more positively as the chassis frame 1 in full lines supported by the wheels 2 on the road. The wheels are arranged in two pairs, one pair at the front end and the other pair at the rear end of the superstructure. The wheels of each pair are disposed on opposite sides of the superstructure and are equally spaced from the longitudinal center line of the superstructure.

The wheels 2 are secured to the superstructure 1 by the wheel or axle carriers 3 which provide for vertical oscillation of each wheel relative to the superstructure. The wheel or axle carriers 3 are arranged in pairs similar to the wheels and each pair is employed for connecting the corresponding pair of wheels 2 to the superstructure. The front wheels 2 and their corresponding wheel carriers 3 form a front pair of banking arms which support the front end of the superstructure.

Each front wheel carrier 3 consists of a lower suspension arm 4, an upper control arm 5, and a wheel support member 6. The lower suspension arm 4 is pivoted at its inner end by a substantially horizontal hinge 7 to a banking hinge support member 8 which in turn is pivoted to the superstructure by an inclined banking hinge 9. The outer end of the lower suspension arm 4 is pivoted by a substantially horizontal hinge 10 to the lower end of the wheel support member 6. The wheel support member 6 carries the substantially vertical pivotal connection or king pin 11 which in turn guides the spindle member 12.

The lower ends of the wheel support members 6 of the front wheel carriers are interconnected by a suitable tie rod 13 to compel the carriers to operate in unison during banking. The upper control arm 5 of each wheel carrier extends between the superstructure and the wheel support member 6 to which it is connected by the horizontally extending hinge 14. The universally movable connection 15 between the arm 5 and the superstructure is positioned to secure substantially constant caster and also a slight inward lean of the corresponding wheel during the banking of the superstructure.

The rear wheels of the embodiment are carried by a rigid axle structure 16. The rear axle carriers 3 are in the form of banking arms to support the rear end of the superstructure for banking. Each rear carrier 3 consists of a lower suspension arm 17 and an upper control rod 18. The lower suspension arm 17 is pivoted at its forward end by a substantially horizontal hinge 19 to a banking hinge support member 20, which in turn is pivoted to the superstructure by an inclined banking hinge 21. The rearward end of the lower rear suspension arm 17 is pivoted to the axle housing of the rear axle structure 16 by means of a universally movable ball joint 22. The upper rear control rod 18 extends between the axle housing 16 and the superstructure and is connected to both by ball and socket joints 23 and 24 respectively.

A torsion spring 25 extends between the banking arms on each side of the superstructure. The spring 25 is preferably rigidly attached to the frame 1 intermediate its lengths. The ends of each spring are hingedly supported in corresponding bearings 26 and 27 carried by suitable frame brackets. The front halves of the springs 25 are arranged to resiliently carry the front end of the superstructure and the rear halves to resiliently carry the rear end of the superstructure. For this purpose a lever arm 28 extends inwardly from the front end of the torsion spring 25 and a lever arm 29 extends outwardly from the rear end of the torsion spring 25. The free ends of the front lever arms 28 are connected by means of the corresponding shackles 30 to cantilever arm 31 extending rearwardly from the corresponding lower front suspension arm 4. Similarly, the free ends of the rear lever arms 29 are connected by means of the corresponding shackles 32 to the cantilever arm 33 extending forwardly from the corresponding lower rear suspension arm 17.

The length and position of the shackles 30 and 32 and the travel path of the banking arm supported end of each shackle relative to its spring supported end during the turn of the respective banking arm about the nearest banking hinge is a co-determining factor for the banking geometry system as set forth in applicant's copending application U. S. Serial No. 742,496 referred to above.

The front pair of banking arms is correlated in its lateral movement to the rear pair of banking arms by providing a connecting rod 34 between one banking arm in the front and one banking arm in the rear of the vehicle. This connecting rod 34 is pivotally supported in the front by the ball and socket joint 35 carried by the lever arm 36, which extends outwardly from the banking hinge support member 8 and forms a part thereof. In the rear the connecting rod 34 is pivotally supported by the ball and socket joint 37 carried by the lever arm 38 which extends inwardly from the rear banking hinge support member 20 and forms a part thereof.

In the earlier disclosures of this inventor referred to above a banking arm is described as existing between the corresponding banking hinge and the road or its equivalent. Each banking arm is geometrically defined as a plane containing the respective banking hinge axis and the effective road contact point, whereby the line of intersection between the two planes of a pair of banking arms constitutes the motion center line for the banking turn of that part of the superstructure which is supported by the pair. A further requirement of the arrangement is that the motion center line should be located "substantially" above the center of gravity of the part of the superstructure supported by the pair of banking arms, to provide in effect a lever for the mass in lateral swinging under the influence of centrifugal forces.

The present invention utilizes the structure described above but changes the geometric requirements of the banking arm system by utilizing engine power as made available in present day cars in the form of hydraulic, vacuum and compressed air, or electrically controlled booster systems to actuate the banking arm mechanism. In general, hydraulic steering power assist units for steering the front wheels of the vehicle are referred to as an example of a power unit for the forces made available herein.

Devices have been proposed and are known in the patent art whereby banking might be achieved solely by the use of such power units. However, while power assist steering units even for light trucks require only a booster mechanism capable of delivering ½ H. P., a unit of 25 H. P. capacity would be needed under consideration of the time and load factors applicable to accomplish a banking effect with such devices.

According to the present invention the superstructure of the vehicle is suspended by means of two or more pairs of banking arms to completely or nearly eliminate the effect of centrifugal forces on the banking mechanism. A booster unit of small capacity will thus be sufficient to turn the superstructure into the desired inclined position, undisturbed by centrifugal forces.

Since the upper outer hinges 14 of the upper control arms 5 turn during the banking motion about the frame supported pivotal joints 15 and effective banking hinge axis and correlative motion center line 39 is created for each front banking arm whereby during the turn of the pair of banking arms substantially no lateral shift of the center of gravity 40 takes place, although the front wheels actually lean inwardly as illustrated in Fig. 4.

In the rear of the vehicle the corresponding center of motion 41 is located only a short distance above the center of gravity 42 for the rear part of the superstructure and the center of gravity moves only a fraction of an inch in the direction of the centrifugal force, as illustrated in Fig. 5.

As in standard cars supported by independently suspended front wheels and a rigid rear axle the center of motion for the oscillation of the superstructure relative to the rigid rear axle is located somewhat below the rear axle housing. In the front of the vehicle the center of motion for the oscillation of the superstructure relative to the road is located substantially in the height of the road, since the front wheels are independently suspended. These same conditions with regard to the oscillation motion center are maintained in the vehicle described according to the invention, and the effect of centrifugal forces on the oscillation system is identical to that on standard cars, subtracting from the improvement achieved by the proposed banking mechanism.

A device spring 43 formed as a U-section leaf spring attached to the frame 1 is arranged to resist fore and aft movement of the connecting rod 34. The two arms of the U lean under pressure against the frame supported bracket 44 and engage the rod 34 at the pivot shaft 45 attached thereto. The connecting rod 34 can shift longitudinally in either direction only after sufficient force is exerted to overcome the pressure of spring 43. The spring 43 serves to keep the superstructure in an upright position even under one sided load conditions exerted on the superstructure which, without this precompressed resilient means, would very easily turn about the banking motion center lines 39 and 41.

The hydraulic pressure needed to operate the lever arm 36 and through it the banking arm mechanism is furnished by the engine of the vehicle which operates the oil pump 46 of the hydraulic power element referred to above.

The element comprises also the oil reservoir 47, the double acting hydraulic cylinder 48, and the control valve 49 comprising a movable grooved spool (not shown). In the neutral position of the control valve 49 oil from the pump can circulate freely throughout the system at practically zero pressure. However, if the valve spool is moved to the right, for instance, oil from the pump 46 is directed to the forward end of the cylinder 48 forcing the piston 50 backwardly. At the same time oil from the rearward end of the cylinder 48 is allowed to return to the reservoir 47. The reverse of this flow of oil is obtained when the spool is moved to the left.

The valve is actuated by the turn of the weight 51 supported by the arm 52 to either the left or the right under the influence of centrifugal forces. The weight 51 is returned to its neutral position by the spring 53. The size and arrangement of the spring 53 controls the timing and the amount of banking of the superstructure. However, the centrifugal force, by inducing the valve operation, still at least controls the operation of the banking arm mechanism and additionally at the same time, partly operates it where the banking center of motion is kept sufficiently high above the center of gravity.

Both the hydraulic power assist element and the weight control arrangement as such are known in the art and are therefore not described and illustrated in detail. Many variations of means, arrangement and operation are possible for the booster unit as stated above. Where closed circuit types of power elements with accumulators are considered suitable they may be employed according to this invention.

In the operation of the mechanism described banking may be secured independently of the amount of precompression set for the device spring 43 as long as the power drawn from the booster unit is large enough to overcome the precompression immediately after the corresponding groove in the valve spool is opened for the flow of the corresponding oil circuit. The reaction of the valve unit depends only on the resistance of the weight 51 against lateral shifting, which can be kept small and substantially independent of one sided loads supported by the wheel suspension of the vehicle.

As in the known power assist steering units the control mechanism works in both directions, facilitating the steering of the vehicle and blocking disturbances from the road. As applied to the banking arm mechanism the power assist unit moves the connecting rod 34 forth or back whenever the valve 49 is operated and also substantially blocks the movement of the connecting rod 34 under any other inducement but the lateral shifting of the weight 51 as described. This feature will greatly contribute to the elimination of any disturbance at the front of the vehicle resulting from the oscillation of the usually rather heavy rear axle structure 16.

An upward or downward movement of either rear wheel would normally cause a lateral shifting of the ball joints 22. Any such shifting will result in a fore and aft shifting of the connecting rod 34 unless such shifting of rod 34 is blocked. In that case the rear axle structure 16 is forced to turn about the left hand ball joint 22 itself as the center of all diagonal oscillation movements of the rear axle. The right hand ball joint 22 will then double its amount of lateral shifting. The rear banking hinge 21 at the right side of the vehicle, not being tied to the front end of the vehicle, is free to turn and thereby compensate for this lateral shifting of the right hand ball joint 22.

In effect the control rod 34 serves as a track bar common both to the rear and to the front end wheel carrier 3, whereby during wheel oscillation the left side wheels are kept in line and the right side wheels are free to shift slightly laterally independently of each other and to compensate for the small differences in arc travel typical for nearly all automobiles.

The invention facilitates the building of a commercially acceptable car by taking the extremes of necessary change out of the banking arm supported vehicle operated solely by centrifugal force, and reducing the force necessary to press a standard automobile against the centrifugal force into an inclined banked position in a 20 to 1 ratio.

Various embodiments of the invention may be employed within the scope of the following claims.

I claim:

1. A vehicle embodying a superstructure supported by a plurality of pairs of banking arms with separate wheels and corresponding wheel carriers, the banking arms of each pair being interconnected and disposed on opposite sides of the superstructure, separate resilient cushion means disposed between the superstructure and the corresponding wheel carriers providing for vertical support of the superstructure and which cushion means tend to yield under the influence of centrifugal forces upon the superstructure on turns to tilt the superstructure outwardly about an oscillation center of motion located near the road, said banking arms being disposed to provide rotational movement of the superstructure about a banking center of motion located near the center of mass of the superstructure, and power actuated means connected to said banking arms to effect said rotational movement of the superstructure in a direction opposite to that effected by the yielding of said cushion means on turns.

2. The structure of claim 1 including means responsive to lateral forces upon turning of the superstructure from a straight path to actuate said power means and assist in effecting banking of the superstructure on the turn.

3. A vehicle comprising a superstructure, a plurality of wheels supporting the superstructure for travel, a plurality of wheel carriers connecting the superstructure and wheels and having resilient cushion means disposed to provide for vertical oscillation of the wheels relative to the superstructure, said wheel carriers being disposed to provide an oscillation center of motion located near the road about which the superstructure turns under the influence of centrifugal forces tending to tilt the superstructure to the outside of a curve in accordance with a yielding of the cushion means and a banking center of motion located substantially in the longitudinal axis containing the center of gravity of the superstructure and about which the superstructure turns in a direction tending to bank the superstructure on a curve, power means actuated by hydraulic pressure to operate said wheel carriers and rotate the superstructure upon said banking center of motion, and means for controlling said hydraulic pressure.

4. A vehicle adapted to bank on turns comprising a superstructure, a plurality of sets of banking arms disposed to support the superstructure and spaced longitudinally of the same, each set of banking arms being connected to the superstructure and constituting at least a pair of opposed banking arms spaced laterally apart on opposite sides of the longitudinal center line of the superstructure and connected to the superstructure at one end by pivotal means and to the effective road support by universally movable joints, means interconnecting the banking arms of each pair to retain the effective universally movable joints for the corresponding pair in substantially constant spaced relation, the plane of each banking arm of a pair of opposed arms containing the corresponding banking axis and the center of the effective universally movable joint therefor meeting the plane of the other arm of the pair in a motion center line for the pair passing near the effective center of mass for the portion of the superstructure supported by the pair, and means including a power banking unit arranged between the banking arm system and the superstructure induced to operate under the influence of centrifugal force to turn the superstructure about the motion center line.

5. A vehicle adapted to bank on turns comprising a superstructure and a plurality of pairs of laterally opposed banking arms supporting said superstructure and extending from the superstructure to the effective road support therefor, said pairs of banking arms being spaced longitudinally of the superstructure and correlated with each other to provide a common axis of rotation for the superstructure during banking and which axis is substantially parallel to the longitudinal center line of the superstructure at all times and located near the center of gravity of the superstructure, and a device for controlling the direction of turn of the banking arms, said device comprising a hydraulic motor connected to at least one of said banking arms and to the superstructure, reversible fluid inlet and outlet conduits for said motor, a normally closed valve in one of said conduits, a lever supported inertia weight connected to said valve, and means operative upon a predetermined degree of rotation of the weight opening said valve to shift the banking arm system into a predetermined position relative to the road.

6. A vehicle adapted to bank on turns comprising a superstructure and a plurality of pairs of laterally opposed interconnected banking arms supporting said superstructure and having each arm secured at one corresponding end thereof to turn on a skew banking line which is correlated to the banking line of the other arm of the pair to provide an angularly movable banking motion center line for the pair extending substantially through the effective center of mass supported by the arms of the pair, and said pairs of banking arms being spaced longitudinally of the superstructure and correlated with each other to provide a common axis of rotation for the superstructure during banking and which axis is substantially parallel to and adjacent the longitudinal center line of the superstructure, and a power assist unit for controlling and operating the turn of the superstructure about the banking motion center line and having means actuated by centrifugal force to induce the operation of the power assist unit.

7. A vehicle adapted to bank on turns comprising a superstructure, at least one transverse axle structure, a plurality of pairs of laterally opposed interconnected banking arms supporting said superstructure, said pairs of banking arms being spaced longitudinally of the superstructure with at least one pair connected at the outer ends thereof by universally movable joints to said axle structure, each banking arm of said last named pair being secured at its inner end to the superstructure to turn on a skew banking line which is correlated to the banking line of the other arm of the pair to provide a motion center line for the pair extending above the effective center of mass supported by the arms of the pair and disposed substantially horizontally, and said pairs of banking arms being interconnected and correlated with each other to provide a common axis of rotation for the superstructure during banking, a power operable means connected between the superstructure and one of said banking arms and adapted to stabilize the same for vertical oscillation of the superstructure when in a neutral position, and control means to actuate said power means under the influence of lateral forces to turn the banking arms and elevate one side of the superstructure and depress the other side relative to the wheels.

8. A vehicle comprising a superstructure, front and rear paired wheels and laterally interconnected wheel supporting means for each pair mounted at opposite sides of the superstructure, hinges connecting each of said wheel supporting means to the superstructure and disposed in spaced relation relative to the vertical axial plane of the wheel, the axis of each of said hinges being upwardly inclined towards the longitudinal axis of the vehicle and toward said vertical axial plane of the wheel with which it is associated, power means connecting said wheel supporting means and the superstructure to turn the same relatively at said hinge axis and thereby rotate the superstructure about its longitudinal axis located in the height of its center of gravity, and means responsive to lateral forces upon a turn of the vehicle to actuate said power means to incline the superstructure to a banked position on the turn.

9. A vehicle adapted to bank on turns comprising a superstructure, a plurality of sets of banking arms disposed to support the superstructure and spaced longitudinally of the same, each set of banking arms being connected to the superstructure and constituting at least a pair of opposed banking arms spaced laterally apart on opposite sides of the longitudinal center line of the superstructure with the connection between each banking arm and the superstructure embodying in effect a banking axis fixed relative to the superstructure, means connecting the banking arms of each pair of banking arms to retain the outer ends of the same in substantially constant spaced relation, resilient means providing for vertical oscillation of the outer end of each banking arm substantially independently of pivotal movement at the banking axis, the plane of each banking arm of a pair of opposed arms containing the corresponding banking axis and the center of the effective road contact point therefore meeting the plane of the other arm of the pair in a banking motion center line for the pair passing near the level of the effective center of mass for the portion of the superstructure supported by the pair of arms at the point where said motion center line crosses over the effective transverse road line at the outer end of the arms, resilient means disposed between the banking arm system and the superstructure to stabilize the latter against diagonal components of force during vertical oscillation of the same, and a power banking assist unit disposed between the banking arm system and the superstructure and including a hydraulic booster having a fluid pump, a reservoir connected to said pump to supply fluid thereto, a double acting hydraulic cylinder carried by the superstructure and connected to said pump to receive power fluid therefrom and to said reservoir to discharge used power fluid thereto, piston means in said cylinder connected to one of said banking arms to control the actuation of said banking arms, and a control valve disposed in the connections between said cylinder and said pumps and reservoir to control the actuation of said piston and effect a turn of the superstructure at the banking motion center line to a banked position and against said resilient means.

10. In a vehicle in which the superstructure is supported for banking on turns by a plurality of pairs of correlated banking arms having corresponding banking axes inclined from the horizontal, at least one pair of banking arms constituting independent wheel mountings and including therein the wheels for supporting the same on the road with wheel support members disposed to carry the corresponding wheels upon substantially vertically disposed pivotal axes and adapted to oscillate vertically relative to the superstructure substantially independently of the corresponding banking axis, a control arm constituting a part of each said latter specified banking arm connected between the wheel support member and the superstructure with the latter connection offset from the inclined banking axis to provide a control of the change in caster and camber during inward banking of the superstructure and provide a parallelogram wheel mounting to maintain the caster and camber within acceptable limits during vertical oscillation of the wheel, and means for determining the inclination of the superstructure relative to the road, said means being actuated by hydraulic pressure generated by the motor of the vehicle and including means for controlling said hydraulic pressure in response to centrifugal forces on a turn.

11. A vehicle of the type wherein the superstructure moves into a banked position in response to power means and in a direction opposite to lateral forces inducing operation of said power means, comprising independently suspended front wheel carriers each comprising a king pin support, a suspension arm hingedly connected to said support, a member connected to said suspension arm on a substantially horizontal axis and connected to the superstructure along an upwardly inclined hinge axis, a second suspension member connected by ball and socket joints to said support and to said superstructure at a point displaced from said axis, resilient means tending to maintain the suspension arms in normal position, and means to connect said power means between the superstructure and the wheel suspension system to effect a turn at said inclined hinge axes.

12. A vehicle comprising a superstructure adapted to bank on turns, a plurality of pairs of opposed banking arms disposed to support said superstructure and spaced longitudinally of the same with at least one pair arranged in the front and at least one pair in the rear of the superstructure and with the banking arms of each pair connected to the superstructure laterally apart on opposite sides of the longitudinal center line of the superstructure, means interconnecting the banking arms of each pair to retain the outer ends of the banking arms in substantially constant spaced relation, means interconnecting the pairs of banking arms to induce the front and rear pairs of banking arms to move laterally substantially in unison during the banking of the superstructure, said front pair of banking arms comprising independently suspended front wheel carriers each comprising a king pin support, a suspension arm hingedly connected to said support, a member connected to said suspension arm on a substantially horizontal axis and connected to the superstructure along an upwardly inclined hinge axis, a second suspension member connected by ball and socket joint to said support and to said superstructure at a point displaced from said axis, resilient means tending to maintain the suspension arms in normal position and power operated means arranged to effect a turn at said induced hinge axes and thereby turn the superstructure to a banked position while the vehicle negotiates a curve.

13. A vehicle comprising a superstructure adapted to bank on turns, a plurality of pairs of opposed banking arms disposed to support said superstructure and spaced longitudinally of the same with one pair arranged in the front of the superstructure constituting independent wheel carriers and one pair arranged in the rear of the superstructure and supported by a rigid axle structure and with the banking arms of each pair connected to the superstructure laterally apart on opposite sides of the longitudinal center line of the superstructure, means interconnecting the banking arms of the pair of banking arms disposed in the front of the vehicle to retain the outer ends of the banking arms in substantially constant spaced relation, a tie connecting at least one banking arm disposed in the front of the vehicle to one banking arm disposed in the rear of the vehicle to induce the front and rear pairs of banking arms to move laterally substantially in unison during the banking of the superstructure, each front banking arm comprising a wheel support member, a suspension arm hingedly connected to the wheel support member, a bracket hingedly connected to the suspension arm and connected to the superstructure on a hinge axis inclined both laterally and longitudinally of the vehicle, and a second suspension arm hingedly connected to the wheel supporting member and pivotally connected to the superstructure at a point lying outside of said axis, and a device for turning the banking arms at said inclined hinge axes, comprising a hydraulic motor, a source of fluid pressure, fluid conduits connecting said motor and source, a normally closed valve in said conduits, a lever supported weight connected to said valve to operate the same upon a predetermined degree of lateral shifting of the weight under the influence of centrifugal forces to thereby shift the superstructure and wheels into a predetermined position relative to the road.

14. In a motor vehicle, a superstructure, a running gear comprising front and rear wheel supported spindles and paired upper and lower pivoted wheel guiding means, hinged connecting means between said wheel guiding means and the superstructure, said connecting means being inclined to intersecting axes of the vehicle to induce the superstructure to assume an angularly inwardly inclined position as the vehicle rounds a curve, resilient means operable by oscillation movement of the wheel guiding means about their pivots, means connecting the front and rear wheel guiding means to cause them to move laterally in unison as the superstructure is subjected to lateral forces and moves into a banked position, additional resilient means to urge the superstructure to return to its normal upright position as the lateral forces are reduced, said additional resilient means being interposed between the superstructure and the connecting means to induce the front and rear guiding means to move in unison and being actuated by turning movement thereof, hydraulic power means actuated by the motor of the vehicle to turn said wheel guiding means relative to the superstructure upon said inclined connecting means, and means for controlling said hydraulic power means in response to lateral forces on a turn.

15. A vehicle comprising a superstructure adapted to bank on turns, a plurality of pairs of opposed banking arms disposed to support said superstructure and spaced longitudinally of the same with one pair arranged in the front and one pair in the rear of the superstructure and with the banking arms of each pair connected to the superstructure laterally apart on opposite sides of the longitudinal center line of the superstructure, means interconnecting the banking arms of each pair to retain the outer ends of the banking arms in substantially constant spaced relation, resilient means associated with each banking arm and disposed to provide for relative vertical oscillation between the superstructure and the point of effective road support for the corresponding banking arm, a tie connecting at least one banking arm disposed in the front of the vehicle to one banking arm disposed in the rear of the vehicle to induce the front and rear pairs of banking arms to move laterally in unison during the banking of the superstructure, and a fluid pressure booster device arranged between the superstructure and the banking arms to effect banking of the superstructure on turns.

16. A vehicle comprising a superstructure adapted to bank on turns, a plurality of pairs of laterally opposed interconnected banking arms supporting said superstructure, said pairs of banking arms being spaced longitudinally of the superstructure, a control rod extending longitudinally of the superstructure to connect and correlate the pairs of banking arms, resilient means disposed between the superstructure and said control rod to resist turning movement of the banking arms at the banking axes and to thereby retain the superstructure upright when free from lateral forces, and a device for controlling banking turn of the superstructure comprising a hydraulic booster carried by the superstructure and linked to the banking structure and including a fluid pump, a reservoir connected to said pump to supply fluid thereto, a double acting hydraulic piston and cylinder carried by the superstructure and connected to said pump to receive power fluid therefrom and to said reservoir to discharge used power fluid thereto, said piston being connected to one of said banking arms to actuate the same, a control valve for the fluid conduits connecting said reservoir, pump and cylinder, and means to actuate said control valve in response to inertia forces upon the superstructure.

References Cited in the file of this patent

UNITED STATES PATENTS

| | | |
|---|---|---|
| 1,423,002 | Mercier | July 18, 1922 |
| 2,353,503 | Rost et al. | July 11, 1944 |
| 2,576,686 | Kolbe | Nov. 27, 1951 |
| 2,580,558 | Kolbe | Jan. 1, 1952 |